H. ANSCHÜTZ-KAEMPFE.
GYROSCOPE COMPASS.
APPLICATION FILED SEPT. 9, 1910.

1,092,816.

Patented Apr. 14, 1914.

3 SHEETS—SHEET 1.

WITNESSES:
G. V. Rasmussen
Louis Alexander

INVENTOR
Hermann Anschütz Kaempfe
BY
Bonesein Knauth
ATTORNEYS

H. ANSCHUTZ-KAEMPFE.
GYROSCOPE COMPASS.
APPLICATION FILED SEPT. 9, 1910.

1,092,816.

Patented Apr. 14, 1914.
3 SHEETS—SHEET 2.

WITNESSES:
G. V. Rasmussen
Louis Alexander

INVENTOR
Hermann Anschütz Kaempfe
BY
Briesen & Knauth
ATTORNEYS

H. ANSCHUTZ-KAEMPFE.
GYROSCOPE COMPASS.
APPLICATION FILED SEPT. 9, 1910.
1,092,816.
Patented Apr. 14, 1914.
3 SHEETS—SHEET 3.
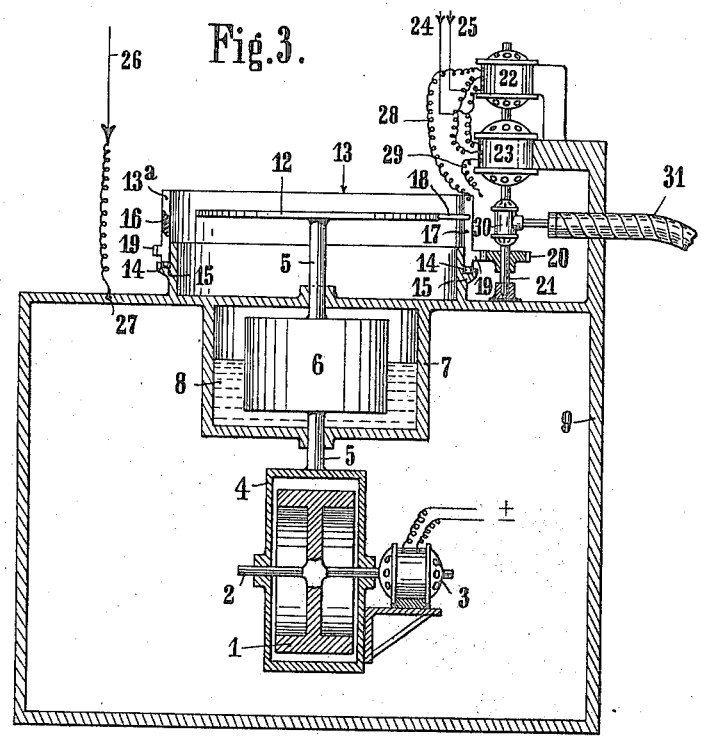
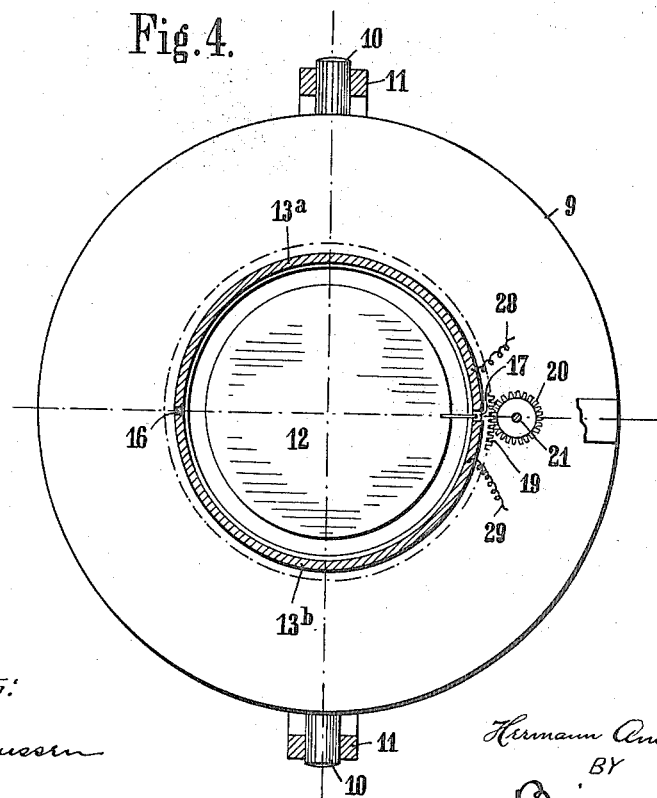

UNITED STATES PATENT OFFICE.

HERMANN ANSCHÜTZ-KAEMPFE, OF NEUMÜHLEN, NEAR KIEL, GERMANY.

GYROSCOPE-COMPASS.

1,092,816.  Specification of Letters Patent.  Patented Apr. 14, 1914.

Application filed September 9, 1910. Serial No. 581,202.

*To all whom it may concern:*

Be it known that I, Dr. Phil. HERMANN ANSCHÜTZ-KAEMPFE, a subject of the Emperor of Germany, residing at Heikendorfer Weg 9, Neumühlen, near Kiel, Germany, have invented certain new and useful Improvements in or Relating to Gyroscope-Compasses, of which the following is a specification.

This invention relates to gyroscope compasses and means for indicating their positions at a distance from the same.

As in the well-known plants for transmitting the positions of customary compasses to a distance, the improved apparatus comprises a master compass or the transmitter, and a sub-compass or the receiver. The purpose of the arrangement is, among others, exactly as in the transmission of positions of customary compasses to a distance, to be able to erect the master apparatus, whose compass-card is set by a gyroscope, at a part of the ship which is protected as much as possible, and to employ one or more of the more simple sub-compasses at the places where the instrument is to be read.

A primary object of the invention is to provide an improved construction both of the sub-compass, the receiver, and of the master compass, the transmitter. To this end, the sub-compass is provided with a device by which the movements of the compass-card are increased mechanically, not optically, in order to facilitate its being read. The master compass, however, is provided with a special contact device, by which the member driving the transmitting device proper is rotated in suitable manner. The transmitting device itself, however, is not comprised in the invention, but one of the well-known synchronizing devices customary in apparatus for transmitting the positions of compasses to a distance or in the art of telegraphy may be employed.

One illustrative embodiment of the invention is represented by way of example in the accompanying drawings, wherein—

Figure 1:
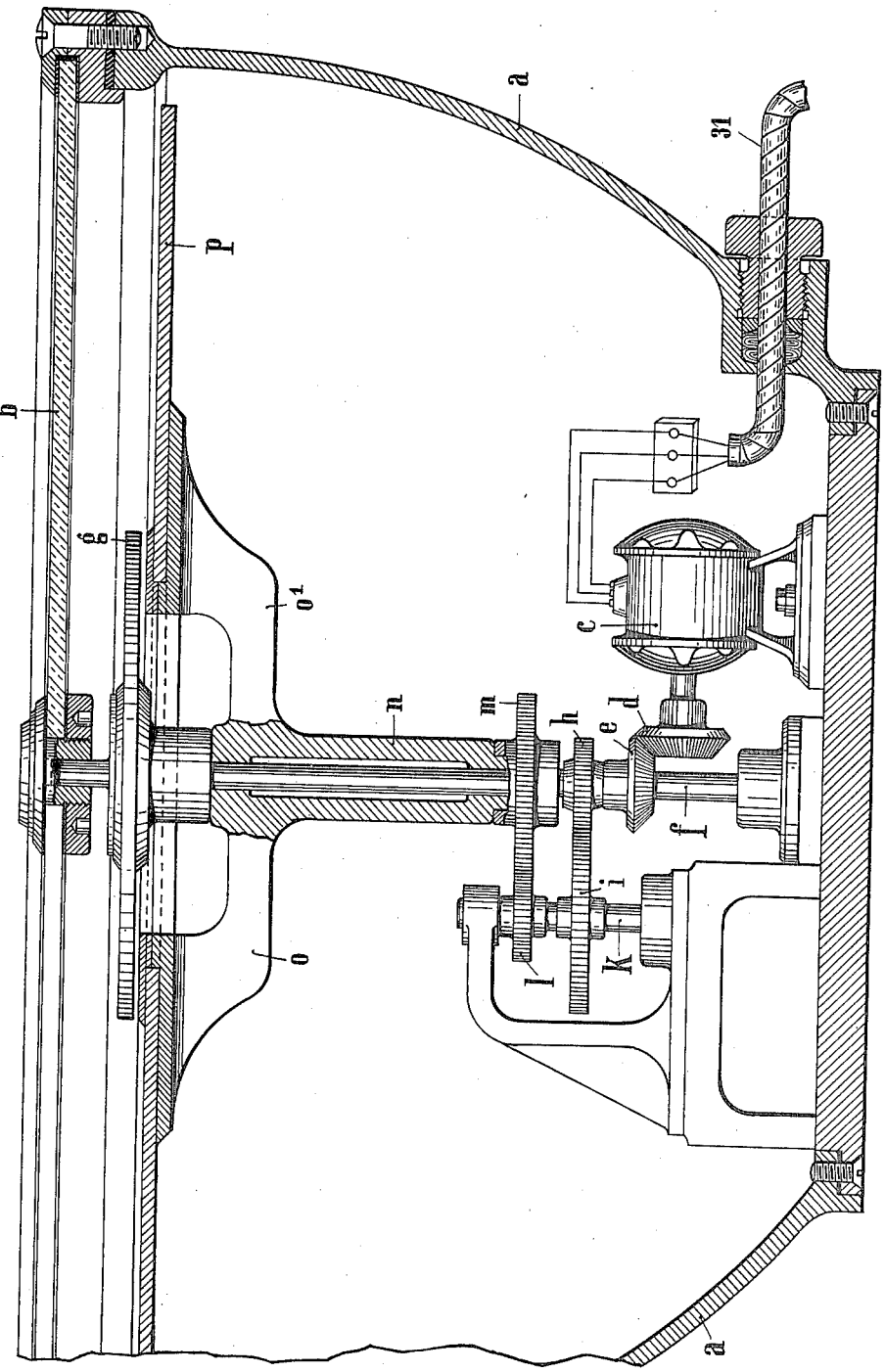
Figure 2:
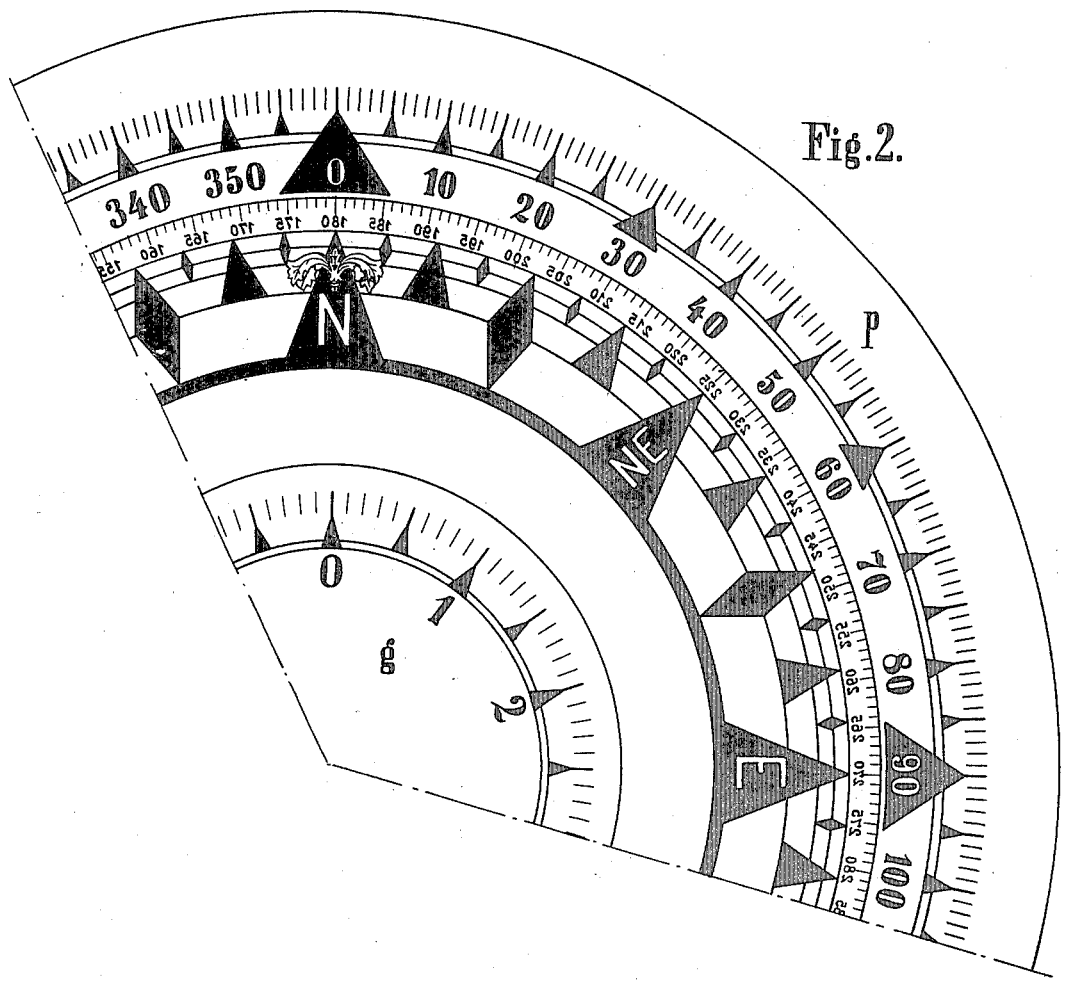

Figures 1 and 2 show the sub-compass, and Figs. 3 and 4 the master compass. Fig. 1 is an elevation partly in section, Fig. 2 a plan view showing part of the cards, on which the position is read, Fig. 3 an elevation, partly in section, and Fig. 4 a top plan view showing the contact device.

Referring to the drawing, according to the invention the sub-compass is provided in addition to the customary card $p$, *i. e.* the principal card, with a second card $g$, *i. e.* a secondary card, which rotates faster than, and is divided differently from, the principal card. In the casing $a$, closed by the glass plate $b$, is provided any suitable driving motor $c$ which is driven by the master compass by means of one of the well-known electric synchronizing devices, so that when the card of the master compass rotates a certain angle this motor also rotates a certain angle. This motor drives the axle $f$, on which the secondary card $g$ is secured, by means of the bevel gears $d$ and $e$. The axle $f$ also carries a spur gear $h$ meshing with the pinion $i$ on the shaft $k$. The latter is geared by means of gears $l$ and $m$ with a bushing or sleeve $n$ which is free to rotate on the axle $f$ and has brackets $o$ and $o^1$ carrying the principal card $p$.

Obviously, the secondary card $g$ runs or is adjusted in dependence on the principal card $p$. According to the ratio of transmission of the gearing $h$, $i$, $l$, $m$ any desired more rapid rotation can be imparted to it than to the principal card, that is it can indicate a definite angular rotation on any desired enlarged scale.

Fig. 2 represents by way of example the secondary card $g$ arranged within the principal card $p$. In this illustrative embodiment the secondary card is divided into ten divisions which are subdivided into tenths, and it rotates thirty-six times during one revolution of the principal card, but it is obviously possible to provide a different ratio of transmission and to divide the card otherwise and to arrange it otherwise than concentric with the principal card.

In the above example the enlargement is six-and-thirty fold; each tenth of a division can be read with the same exactitude as a whole division on ordinary cards. The mechanical enlargement, however, in addition, enables the pilot to estimate the relative velocities of the relatively slow angular movements of the ship better than formerly.

The construction of the master compass is based on the well-known arrangement, in which the vertical axle of the compass system, whose rotation relatively to the ship is measured, has not to overcome any appreciable frictional forces, but the requisite work is supplied by special motors. Direct current motors have been used heretofore, to which, however, various defects are attached. The exactness of making and breaking contact left something to be desired or rendered relatively complicated constructions necessary. An additional defect of the principle referred to consisted in the contact device having to be placed by hand into the correct position when starting it. One object of this invention is to remedy these defects. This is done, on the one hand, as already mentioned, by constructing the contact device in a special manner, and, on the other hand, by employing three-phase alternating-current motors which have an artificial phase and are connected in a special manner with one another and the compasses.

Referring to Fig. 3, the gyrating mass 1 mounted on the axle 2, which is driven by a motor 3 and journaled in a casing 4, is carried by the revoluble vertical axle 5. This axle is suspended by means of the float 6 floating in a suitable liquid 8 in the box 7. The box is provided on the frame 9 which, on its part, is journaled in well-known manner by means of the pivots 10 in a Cardanic ring 11. Thus the gyroscope compass can rotate around three intersecting axes, namely the axes 2, 5, and 10, but rotation around the latter axis is partially arrested by gravity, i. e., can only take place by overcoming a certain resistance. In such gyroscopes the axis of rotation of the gyrating mass 1 is placed, as is known, in the north-south direction.

The card 12 is attached to the top end of the axle 5 and the position of the gyroscope can be read directly thereon. A metal ring 13 is arranged concentric with this card, can rotate readily around the axle 5 and is preferably journaled on balls 14 in a ball-bearing 15. The ring is divided into two halves 13ª and 13ᵇ electrically insulated from one another. In the illustrative embodiment they are insulated by a piece of insulation 16 on the one side and a space 17 diametrally opposite the same dividing the ring into two halves.

The card 12 is provided with a contact spring 18, the outer end of which normally projects into the space 17. When the gyroscope compass rotates relatively to the ship the outer end of the spring 18 slides on the inner periphery of one of the halves 13ª or 13ᵇ of the ring without having to overcome any appreciable resistance, and an electric contact is thereby closed which brings about a rotation of the ring in the sense of the relative rotation which has taken place. To this end, the contact ring 13 is provided with a rim of teeth 19 meshing with a pinion 20. On the axle 21 of this pinion are secured two three-phase motors 22 and 23, one phase winding of each of which is connected in parallel to the two feeders 24 and 25 of a three-phase system. The third feeder 26 of the three-phase system is connected at 27 to the frame 9 and thus connected with the card 12 and contact spring 18, and the halves 13ª and 13ᵇ of the ring are connected by conductors 28 and 29 with the third phase winding of each of the motors 22 and 23.

When the spring 18 electrically connects the card with one of the two halves 13ª and 13ᵇ of the ring, the corresponding three-phase motor is connected in circuit, the pinion 20 is driven in the one or other direction, and this imparts its motion to the contact ring 13 which at once moves in the same sense in which the vertical gyroscope axle previously rotated relatively to the ship. The rotation continues as long as the contact spring contacts with one of the two halves of the ring and only ceases when the spring is again located in the space 17. No injurious sparking takes place, because only the one phase, if desired, an artificial phase carrying only a very little current, is interrupted, and the sparks formed when an alternating current is interrupted are smaller than in the case of direct current.

Any suitable synchronizing device, which is not comprehended in this invention, is driven by the axle 21 of the pinion 20 and imparts its motion to a distance. In the drawing this synchronizing device is diagrammatically represented as an electrical device 30 which is connected by a cable 31 with the motor c of the sub-compass and so arranged that whenever the axle 21 rotates one revolution the axle of the motor c rotates an equal amount.

The arrangement is preferably such that when contact is made between the spring 18 and the part 13ª or 13ᵇ the part 13ª or 13ᵇ moves correspondingly very rapidly, so that the contact spring practically does not contact with the inner periphery of one of the halves of the ring but moves almost simultaneously just as rapidly as the card of the gyroscope compass. This is readily brought about by suitably selecting the ratio of transmission of the toothed rim 19 and the pinion 20, and by suitably predetermining the speeds of the motors 22 and 23. The torque of these motors may be as great as desired so that any desired force can be exercised by them. Obviously no regard need be had to the frictional resistances which have to be overcome for adjusting the card of the sub-compass, because the secondary motor of the synchronizing device may be as powerful as desired.

I claim:—

1. The combination, with a gyroscope compass, of a sub-compass comprising a principal card and a secondary card geared thereto to move at a greater speed, and means comprising a synchronizing device controlled by the gyroscope compass for driving the principal card of the sub-compass in a definite relation to the movement of the gyroscope compass.

2. The combination of a gyroscope compass comprising a freely-revoluble, vertical axle carrying a compass card; a freely revoluble ring divided into two halves electrically insulated from one another and having a space between the ends of the same arranged concentric with said axle; a contact spring on said card normally in said space; a sub-compass comprising a principal card and a secondary card geared thereto to move at a greater speed; and electrical means connected with the halves of said ring and comprising a synchronizing device for driving the principal card of the sub-compass in a definite relation to the movement of the card of the gyroscope compass.

3. The combination of a gyroscope compass comprising a freely-revoluble, vertical axle carrying a compass card; a freely revoluble ring divided into two halves electrically insulated from one another and having a space between the ends of the same arranged concentric with said axle; a contact spring on said card normally in said space; a sub-compass comprising an axle carrying a principal card, speeding-up gearing driven by the latter axle and a secondary card driven by said gearing; a motor driving the latter axle; a synchronizing device controlling said motor; and electrical means for controlling the synchronizing device in dependence on the movement of the gyroscope compass card, comprising a shaft geared with said ring and controlling said synchronizing device, two three-phase motors wound for running in opposite directions on said shaft, a three-phase system having one feeder electrically connected with said spring, two windings of each motor being connected in parallel with said system and the two third windings of the motors being connected with the halves of the ring, as set forth.

In witness whereof I have hereunto signed my name this 24th day of August 1910 in the presence of two subscribing witnesses.

DR. HERMANN ANSCHÜTZ-KAEMPFE.

Witnesses:
 JULIUS ROJRKE,
 VIKTOR PAMEGREN.